United States Patent [19]

Parrish

[11] Patent Number: 5,218,008
[45] Date of Patent: Jun. 8, 1993

[54] POLYETHERS STABILIZED WITH 6-CHROMANOL DERIVATIVES

[75] Inventor: Donald B. Parrish, Lake Jackson, Tex.

[73] Assignee: The Dow Chemical Company, Midland, Mich.

[21] Appl. No.: 949,614

[22] Filed: Sep. 23, 1992

Related U.S. Application Data

[63] Continuation of Ser. No. 791,826, Nov. 13, 1991.

[51] Int. Cl.$^5$ .................................................. C08V 9/02
[52] U.S. Cl. ..................... 521/114; 521/170; 521/174; 524/751; 528/48; 568/701
[58] Field of Search ............... 521/114, 170, 174; 524/751; 528/48; 568/701

[56] References Cited

U.S. PATENT DOCUMENTS

| | | | |
|---|---|---|---|
| 4,584,253 | 4/1986 | Lin et al. | 430/59 |
| 4,599,286 | 7/1986 | Limberg et al. | 430/59 |
| 5,053,316 | 10/1991 | Suzuki et al. | 430/288 |

FOREIGN PATENT DOCUMENTS

| | | |
|---|---|---|
| 035677 | 9/1981 | Fed. Rep. of Germany . |
| 54-055043 | 5/1970 | Japan . |
| 54-034352 | 3/1979 | Japan . |
| 54-066994 | 5/1979 | Japan . |
| 55-127454 | 10/1980 | Japan . |
| 58-034843 | 3/1983 | Japan . |
| 58-096638 | 6/1983 | Japan . |
| 58-191733 | 11/1983 | Japan . |
| 60-112847 | 6/1985 | Japan . |
| 62-086036 | 4/1987 | Japan . |

*Primary Examiner*—Morton Foelak

[57] ABSTRACT

6-chromanol derivatives are used as antioxidants in polyethers. These, particularly in conjunction with other antioxidants, provide excellent protection against oxidation at very low levels of use. They are particularly useful in polyethers for preparing polyurethane slabstock foam.

10 Claims, No Drawings

POLYETHERS STABILIZED WITH 6-CHROMANOL DERIVATIVES

CROSS-REFERENCE TO RELATED APPLICATION

This is a continuation of application Ser. No. 07/791,826 filed Nov. 3, 1991.

BACKGROUND OF THE INVENTION

This invention relates to polyethers containing an antioxidant, as well as polyurethanes made from such polyethers.

Polyethers are used in a great number of applications, particularly aliphatic polyethers, are prone to oxidation, which results in degradation of the polyether, and in polyurethanes made therewith.

Thus, many polyethers are sold as blends containing an antioxidant package. The antioxidant most commonly used in polyethers is 2,6-di-t-butyl-4-hydroxytoluene (BHT, or a mixture of antioxidants of which BHT is a major component. BHT is typically used at a level of 3000–5000 ppm, based on the weight of he polyether, even when additional antioxidants are used.

Although BHT is an effective antioxidant, its use has several drawbacks. Antioxidants are generally used in small quantities, and so must be metered accurately into the polyether to provide optimal levels. This is made difficult with BHT, since it is a solid and is therefore difficult to meter accurately.

More importantly, BHT is volatile, which causes some significant problems. When making polyurethanes, especially flexible foams, high temperatures are encountered during the foaming process. These high temperatures cause the BHT to vaporize and escape from the foam. Thus, a significant portion of the BHT is lost. The effect of this loss is seen in two ways. Portions of the foam degrade due to the exotherm from the foaming process. The foam may also be subject to a slower degradation over time.

The degradation of the foam results in a loss of physical properties. In many cases, this loss of physical properties is such that large portions of the foam, and perhaps the entire foam, is unusable. In extreme cases, the foam can catch fire. The degradation may also manifest itself by discoloring the foam, which is in itself a very substantial problem. Many foams must be very white for cosmetic purposes. Other foams are dyed to indicate their grade. In those instances, the discoloration forms undesirable conjugate colors with the dyes.

Another problem with BHT is that although solid, it sublimes. The BHT that is not lost during foam formation tends to sublimate. In many furniture, carpeting and automobile applications, the foam is in contact with a fabric or plastic film. The BHT which sublimes often discolors this material.

Thus, it is desirable to provide an effective antioxidant for polyethers which is less volatile than BHT. It is further desired to provide an antioxidant for polyethers which will inhibit loss of physical properties in a polyurethane made from the polyether. It is even more desirable that the antioxidant also inhibit discoloration in the polyurethane. In addition, it is further desired to provide a liquid antioxidant for polyethers.

SUMMARY OF THE INVENTION

In one aspect, this invention is a polyether containing a 6-chromanol derivative in an amount effective to inhibit the oxidation of said polyether.

In a second aspect, this invention is a polyether containing a 6-chromanol derivative in an amount effective to inhibit the oxidation of said polyether and an effective amount of an additional antioxidant.

In a third aspect, this invention is an improvement in a method for preparing a polymer wherein an isocyanate-reactive polyether is reacted with a polyisocyante, characterized in that the isocyanate-reactive polyether contains a 6-chromanol derivative in an amount effective to inhibit the oxidation of said polyether.

In a fourth aspect, this invention is a polyether polyurethane, polyether polyurethane-urea or a polyether polyurea containing a 6-chromanol derivative in an amount effective to inhibit the oxidation of said polyether polyurethane, polyether polyurethane-urea or polyether polyurea.

It has been found that 6-chromanol derivatives are especially efficient antioxidants for polyethers. Surprisingly, these derivatives inhibit the oxidation of the polyether as efficiently as BHT-based antioxidant systems, at a substantially-reduced level of use. This effect is particularly noticeable when the polyether is used in making polyurethane foam. The foam shows comparable or better physical properties and in preferred embodiments, comparable or better color than foam made with much greater levels of BHT-based antioxidant systems. The use of the 6-chromanol derivative also permits the use of a liquid antioxidant which permits easier, more consistent metering in the polyether.

DETAILED DESCRIPTION OF THE INVENTION

The antioxidant used in this invention is a liquid 6-chromanol derivative. 6-chromanol is represented by the structure:

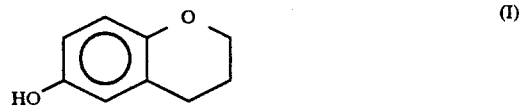

(I)

The antioxidants of this invention are substituted such that the derivative is liquid. Such antioxidants can be represented by the structure:

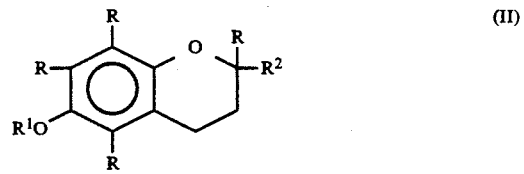

(II)

wherein each R is independently hydrogen or inertly substituted $C_{1-8}$ alkyl, preferably hydrogen or methyl. $R^1$ is such that it does not unduly interfere with the antioxidant activity of the derivative, and is preferably hydrogen or the residue after removal of an —OH group from (1) a mono or polycarboxylic acid or (2) a partially esterified polycarboxylic acid having at least one residual carboxylic acid group. Preferred are hydrogen, $C_{2-12}$ alkyl carbonyl, or the residue of succinic acid or of succinic acid monopoly(ethylene glycol) ether. More preferred are hydrogen and methyl carbonyl (residue of acetic acid), and hydrogen is most preferred. $R^2$ is hydrogen or an inertly substituted hydrocarbyl group. The $R^2$ group is preferably an acyclic hydrocarbyl group, which can contain up to 20 carbon atoms or more, provided that the derivative is a liquid. The $R^2$ group can be saturated or contain one or more unsaturated sites. The $R^2$ group may be linear or branched. Two especially preferred $R^2$ groups are:

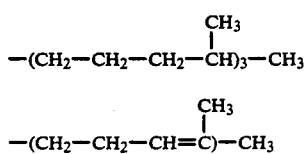

because these groups appear on naturally occurring 6-chromanol derivatives.

When $R^2$ is structure III or IV, then it is preferred that the R group attached to the 2 carbon atom be methyl. Those derivatives wherein $R^2$ is structure III and the R groups attached to the 2 carbon atom is methyl are most preferred. The derivative wherein $R^2$ is structure III, $R^1$ is hydrogen and the R attached to the 2 carbon atom is methyl is known as tocol, and has the structure:

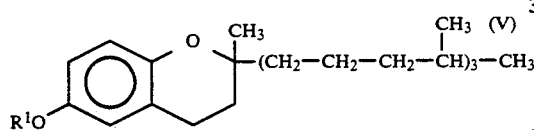

Tocol is conveniently prepared by condensing hydroquinone with phytol, as described by Pendse and Karrer, *Helv. Chim. Acta* 40, 1937 (1957).

In addition to tocol, the various tocopherol compounds are useful. Tocopherol compounds are 6-chromanol derivatives in which $R^2$ is structure III or IV, $R^1$ is hydrogen and the R attached to the 1 carbon atom is methyl. These include δ-tocopherol (2,8-dimethyl-2-(4,8,12-trimethyltridecyl)-6-chromanol), β-tocopherol (2,5,8-trimethyl-2-(4,8,12-trimethyltridecyl)-6-chromanol), γ-tocopherol (2,5,8-trimethyl-2-(4,8,12-trimethyltridecyl)-6-chromanol), α-tocopherol (2,5,7,8-tetramethyl-2-(4,18,12-trimethyltridecyl)-6-chromanol) (also known as vitamin E) ζ$_2$-tocopherol (2,5,7-trimethyl-2-(4,8,12-trimethyltridecyl)-6-chromanol), ζ$_1$-tocopherol (2,5,7,8-tetramethyl-2-(4,8,12-trimethyl-3,5,7-tridecatrienyl)-6-chromanol) and ε-tocopherol (2,5,8-trimethyl-2-(4,8,12-trimethyl-3,5,7-tridecatrienyl)-6-chromanol). It will be appreciated that several of these tocopherol compounds have both d and l stereoisomers. In each instance, both the d and l isomers, or mixtures thereof, are useful.

Among the foregoing, tocol, δ-tocopherol, and α-tocopherol are more preferred on the basis of availability and antioxidant activity. Most preferred is a α-tocopherol or a mixture of tocopherols of which α-tocopherol constituents at least 50%, more preferably at least 80% by weight.

All tocopherol compounds mentioned above are available from natural sources. In addition, these are synthetic methods for making certain of these. These include: Green et al., *J. Chem. Soc.* 1959, 3374, Schudel et al., *Helv. Chim. Acta* 46, 2517 (1960) and Bergel et al., *J. Chem. Soc.* 1938, 1382, as well as GB 900,085 (1961).

Other 6-chromanol derivatives can be prepared in a method analogous to the preparation of tocol. In general, these derivatives can be prepared according to the reaction of hydroquinone or ring-substituted hydroquinone with a 1-hydroxyalk-2-ene, such as can be represented by the structure:

$$HOCH_2-CH=CRR^2$$

wherein R and $R^2$ have the meanings described before. This reaction can be represented as:

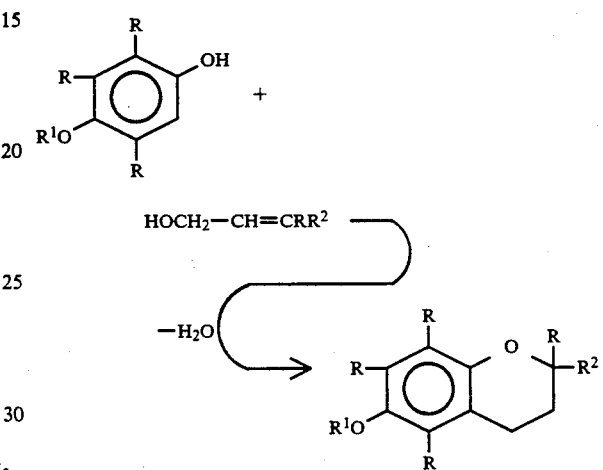

Other synthetic routes are described, for example, by Scott et al., *Helv. Chim. Acta* 50, 290 (1976), Cohen et al., *J. Org. Chemistry* 41, 3505 (1976), and Barner and Schmid, *Helv. Chim. Acta* 62, 2384 (1979).

The 6-chromanol derivative is used in an amount sufficient to inhibit oxidation of the polyether. It is generally useful to use as little antioxidant as possible in order to reduce cost. Amount of the 6-chromanol derivative up to about 5000 ppm, based on weight of polyether, can be used, but an advantage of this invention is the 6-chromanol derivative gives excellent results at low concentrations. Thus, a preferred amount of the 6-chromanol derivative is from about 50 to about 1000 ppm. Further, the cost effective performance of the 6-chromanol derivative has been discovered to peak at concentrations between 50 and 200 ppm. Above 200 ppm, the color stabilization of the polyether and polyurethanes made therefrom is often not further improved and sometimes decreased slightly. Thus, the most preferred amount of the 6-chromal derivative is about 50 to about 200 ppm.

The 6-chromanol derivatives is very effective at reducing the degradation of the polyether, but in performing this function, the 6-chromanol derivative itself degrades and forms colored degradation products. Thus, in making polyurethane foam for example, the use of 6-chromanol alone often provides a foam having excellent physical properties but is nonetheless discolored. Accordingly, when discoloration is a particular problem, it is preferred to incorporate an additional antioxidant into the polyether, which inhibits the formation of colored degradation products of the 6-chromanol.

One type of additional antioxidant is a hindered phenol. Examples of these include 2,6-di-t-butyl-4-methyl phenol (BHT), 2,4-dimethyl-6-octyl phenol, 2,6-di-t- butyl-4-ethyl phenol, 2,6-di-t-butyl-4-n-butyl phenol, 2,2'-methylene bis(4-methyl-6-t-butyl phenol), 2,2'-methylene bis (4-ethyl-6-t-butyl phenol), 2,4-dimethyl-6-t-butyl phenol, 4-hydroxymethyl-2,6-di-t-butyl phenol, N-octadecyl-beta (3,5-di-t-butyl-4-hydroxylphenyl) proprianate, mixtures thereof and the like. Others include tris-(3,5-di-t-butyl-4-hydroxybenzyl)isocyanurate, 3,5-di-t-butyl-4-hydroxyhydrocinnimic acid triester of 1,3,5-tris-(2-hydroxyethyl)-s-triazine-2,4,6-(1H,3H,5H)-trione (Cyanox TM 1760 available from American Cyanamid Corp.), 4,4'-butylidene-bis-(6-t-butyl-m-cresol), 2,2-bis[4-(2-(3,5-di-t-butyl-4-hydroxyhydrocimmimoyloxy)) ethoxyphenyl] propane, octadecyl-3,5-di-t-butyl-4-hydroxy hydrocinnimate (Naugard TM 76, Irganox TM 1076), 1,1,3-tris-(2-methyl-4-hydroxy-5-t-butylphenyl)butane. Still others include tetrakis [3,5-di-t-butyl-4-hydroxyhydrocinnimate] (such as Irganox TM (1010), and the 3,5-di-t-butyl-4-hydroxyhydrocinnimic acid ester of a mixture of C7-C9 alcohols (Irganox TM L-135) or the corresponding diesters of polyethylene glycol or a propropylene glycol.

As mentioned before, it is preferred in this invention to use liquid antioxidants. Thus, those of the foregoing which are liquid are preferred.

When a hindered phenol is used as an additional antioxidant, it is advantageously used in an amount in the range from about 100 to about 2000, preferably about 200 to about 800, more preferably 240 to about 400 ppm, based on weight of polyether. These amounts, especially the preferred amounts, are far lower than those levels of hindered phenol ordinarily used to stabilize polyethers, especially for polyurethanes applications.

Another type of additional antioxidant is a diaryl amine. Suitable such diaryl amines include those described, for example, in U.S. Pat. Nos. 3,452,056, 3,505,225, 3,655,559, 4,077,807, 4,837,259 and 4,914,137, all incorporated herein by reference. Preferred are alkyl-substituted diaryl amines such as can be represented by the structures:

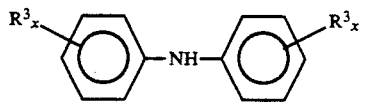 (VI)

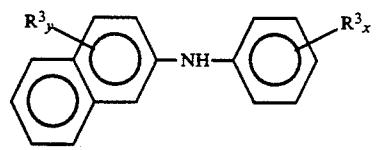 (VII)

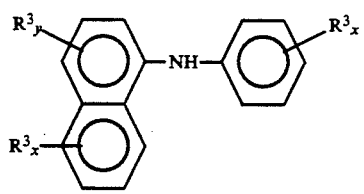 (VIII)

wherein each $R^3$ is alkyl, aryl-substituted alkyl or alkoxy, each y is independently a number from 0 to 3 and each x is independently a number from 0 to 4. Each x and each y is preferably 0 or 1, more preferably 1. The fused ring structures are less preferred. $R^3$ is preferably an alkyl or aryl-substituted alkyl group having a tertiary carbon atom is bonded, when possible, to the aromatic ring at the position para to the amine group. In the foregoing, the aryl groups or the alkyl groups, or both, may be inertly substituted, such as by halogen, or alkoxy groups. As mentioned before, those diaryl amines which are liquid are particularly preferred. Also useful are ketone condensation products of any of the foregoing, particularly acetone condensation products. Exemplary commercial diaryl antioxidants include Naugard TM 445, Naugard TM A, Naugalube TM 438, Naugard TM J, Naugard TM 403, Naugard TM 431, Naugard TM 76 and Naugard TM 529, all available from Uniroyal Chemicals; and Irganox TM 5057 (reaction product of N-phenyl benzenamide and 2,2,4-trimethylpentene), from Ciba-Geigy Corp. Preferred are Naugard TM 431, Irganox TM 5057 and Naugard TM 529 antioxidants.

The diaryl amine, when used, is advantageously present in an amount from about 10 to about 1000 ppm, preferably about 40 to about 400 ppm, more preferably about 60 to about 200 ppm, based on the weight of polyether.

A third type of additional antioxidant is an organophosphite such as triphenyl phosphite, tridecyl phosphite, tris nonyl phenyl phosphite, phenyl diisodecyl phosphite and the like. Preferred is phenyl diisodecyl phosphite. This type of additional antioxidant is preferably used in conjunction with other additional antioxidants when the polyether is to be exposed to particularly high temperatures. The organophosphites are advantageously used in amounts from about 20 to about 2000, preferably about 50 to about 500, more preferably from about 100 to about 200 ppm, based on weight of polyether.

It is preferred to use a mixture of a liquid hindered phenol and a liquid diphenyl amine as additional antioxidants. This mixture can be prepared from any of the foregoing hindered phenol and diphenyl amine antioxidants, or may be a commercially available blend of a hindered phenol and a diphenyl amine. The most preferred antioxidant compositions are blends of commercial grade α-tocopherol, tocol or δtocopherol with about 0.5–5 parts of a liquid hindered phenol per part of α-tocopherol and about 0.5 to about 3 parts of a liquid diaryl amine antioxidant per part α-tocopherol, optionally further containing about 0.5 to about 3 parts of a phosphite antioxidant per part α-tocopherol. A particularly useful antioxidant mixture includes 1 part commercial grade α-tocopherol, about 2–5 parts of Irganox 135 liquid phenol antioxidant, about 0.5–2 parts Irganox L-5057 liquid diphenyl amine antioxidant, and about 0.5–3 parts phenyl diisodecyl phosphite.

It is preferred to use purified antioxidants which themselves have low color, whenever color in the polyether is a significant concern.

The polyether is a material having a plurality of oxyalkylene units. Suitable such polyethers are polymers of alkylene oxides and other cyclic ethers, such as ethylene oxide, propylene oxide, 1,2-butylene oxide, 2,3-butylene oxide, styrene oxide, tetrahydrofuran, and the like. Preferred polyethers are polymers of ethylene oxide, propylene oxide, butylene oxide and mixtures of these. Block copolymers of two or more of these are also useful, especially block copolymers of propylene oxide.

The polyether can be prepared by the reaction of the cyclic ether in the presence of an initiator compound, as is taught, for example, in U.S. Pat. Nos. 3,383,243 and 4,595,743, incorporated herein by reference. Suitable initiator compounds are those having one or more active hydrogen atoms per molecule (i.e. a functionality of 1 or more). The preferred initiator functionality depends on the intended use of the polyether. For making polyurethanes, the initiator functionality is advantageously about 2 to about 16. For a polyether used to make elastomeric polyurethanes, an initiator functionality of about 2 to about 4, especially about 2 to about 3.3 is preferred. For a polyether for making a rigid polyurethanes, an average initiator functionality of about 3 to about 8 is preferred. The functionality of the initiator compound is the same as the nominal functionality of the polyether.

The equivalent weight of the polyether is not critical to the invention, and also usually depends on the intended use of the polyether. For most polyurethane applications, an equivalent weight per isocyanate-reactive group from about 100 to about 10,000 is suitable.

Preferred polyethers for making slabstock flexible foam are polymers of propylene oxide or random copolymers of propylene oxide and a minor amount of ethylene oxide, optionally end-capped with up to 20% ethylene oxide, based on the total weight of the polyether, having an average nominal functionality of about 2 to about 3.5 and an equivalent weight from about 800 to about 3000.

Preferred polyethers for making molded polyurethanes, cellular or noncellular, are polymers of propylene oxide having an oxyethylene end-cap constituting up to 20 weight % of the polyether, having an average nominal functionality of about 2 to 3.5 and an equivalent weight from about 1100 to about 3000.

The blends of this invention are made by simply mixing the antioxidant and polyether together at the aforementioned proportions. Solid antioxidants may require melting before blending into the polyether, so, as stated before, liquid antioxidants are preferred. When an additional antioxidant is used, the antioxidants can be blended into the polyether in any order, or preblended and metered in simultaneously. After blending, the polyether is immediately ready for use.

The polyether is useful in a variety of applications, including brake fluids, lubricants, waxes, rheology modifiers and the like. The polyester can be aminated in various processes, such as are described in U.S. Pat. Nos. 3,654,370, 4,772,750 and 4,847,416 to form an amine-terminated material which can be used to make polyurea polymers, epoxies and other polymers. These amine-terminated polyethers can also be further reacted with an aldehyde or ketone to make imine-terminated polyethers as described in U.S. Pat. No. 4,749,129. The polyether can also be used in making polymer-modified polyols such as described in, for example, U.S. Pat. Nos. 4,374,209, 4,172,825, 4,233,425, 4,394,491, 4,451,255, 4,324,716 and 4,460,715, all incorporated herein by reference. These polymer-modified polyols include dispersions containing 2 to about 50% solids, wherein the term solids refers to the weight of the dispersed polymer phase. The dispersed polymer is advantageously a polyurea, a polyurethane, or a vinyl polymer or copolymer such as a stryrene/acrylonitrile copolymer.

As mentioned before, a primary use of polyethers is in making polyurethanes. Of particular interest are polyurethanes which during their manufacture or use are exposed to moderately elevated temperatures (50°–110° C.) for prolonged periods, such as automobile fan belts or timing belts, or to high temperatures (above 110° C.) even for short periods, such as slabstock flexible foam. It is these polymers in which the demand on the antioxidant is usually the greatest.

Of particular interest is the manufacture of slabstock polyurethane foam, which is typically prepared in large buns. When the buns are made, the polyether and water, which is issued as a blowing agent, react exothermically with a polyisocyanate. Due to the size of the buns, the heat from the exothermic reaction cannot escape from the center of the bun. Thus, the center of the bun is exposed to very high temperatures and strongly oxidative conditions. Because of this, the center of the bun is often discolored and degraded. This problem is exacerbated during warm and humid weather. In addition, recently developed high water formulations develop even greater exotherms than conventional formulations, and also add to the problem.

The preparation of slabstock polyurethane foam is well known and described, for example, in U.S. Pat. No. 5,037,860, incorporated by reference. In general the preparation of flexible polyurethane foam involves reacting together an organic polyisocyanate with the polyether/antioxidant blend of the present invention, in the presence of a blowing agent and under conditions sufficient to form the polyurethane foam. A polymer-modified polyether of this invention is frequently used in making slabstock foam.

Any of the organic diisocyanates and polyisocyanates normally employed in the preparation of flexible polyurethane foams can be employed in the present invention. A preferred group of polyisocyanates comprises the aliphatic, cycloaliphatic and aromatic polyisocyanates.

Illustrative aliphatic and cycloaliphatic polyisocyanates, but non-limiting thereof, are ethylene diisocyanate, 1,4-tetramethylene diisocyanate, 1,6-hexamethylene diisocyanate, 1,12-dodecane diisocyanate, cyclobutane-1,3-diisocyanate, cyclohexane-1,3- and 1,4-diisocyante, 1,5-diisocyanato-3,3,5-trimethylcyclohexane, 2,4- and/or 2,6-hexahydrotoluene diisocyanate, perhydro-2,4'- and/or 4,4'-diphenylmethanediisocyanate ($H_{12}$MDI), isophorone diisocyanate, and the like.

Illustrative aromatic polyisocyanates, but non-limiting thereof, include, for example, 2,4- and/or 2,6-toluene diisocyanate (TDI), 2,4-diphenylmethane-diisocyanate, 1,3- and 1,4-phenylene diisocyanate, 4,4'-diphenylmethane diisocyanate (MDI) (including mixtures thereof with minor quantities of the 2,4'-isomer), 1,5-naphthylene diisocyanate, triphenylmethane-4,4',4''-triisocyanate, polyphenlypolymethylene polyisocyanates, and the like.

The polyisocyanate is used in an amount sufficient to provide an isocyanate index of about 60–200, preferably about 80–150, more preferably about 90–125, most preferably about 95–110. At higher indices, trimerization of the polyisocyanate may occur, causing the foam to lose flexibility. At lower indices, insufficient curing occurs, causing the foam to have poor properties. When MDI or derivative thereof is used as the polyisocyanate, preferred isocyanate indices are from about 60–110, with 70–103 being more preferred, as MDI tends to provide a board-like foam at indices greater than about 110, but provides a highly resilient foam at indices as low as about 60. The "isocyanate index" is 100 times the ratio of isocyanate groups to isocyanate-reactive groups contained in the mixture which reacts to form the foam.

In addition, derivatives and prepolymers of the foregoing polyisocyanates such as those containing urethane, carbodiimide, allophanate, isocyanurate, acylated urea, biuret, ester and similar groups are useful herein.

The blowing agent, another component of the formulation, is any material which is capable of generating a gas under the conditions of the reaction of a polyisocyanate and a isocyanate-reactive compound. Such materials include air, carbon dioxide, nitrogen, water, formic acid, low-boiling halogenated alkanes, finely divided solids, the so-called "azo" blowing agents such as azobis(formamide) and the like. Preferred are water, the low-boiling halogenated alkanes, or mixtures thereof. Blowing agents are advantageously employed in a quantity sufficient to provide the foam with a bulk density from about 0.5, preferably about 0.9, more preferably about 1.0 to about 6 or less, preferably about 4, more preferably about 3 pounds per cubic foot. The halogenated alkanes, including methylene chloride, dichlorodifluormethane, monochlorodifluoromethane, monochlorodifluoromethane and the like, generally provide the desired density when employed in amounts from about 5 to about 50 parts per 100 parts isocyanate reactive compound. Lesser amounts are useful when employed in conjunction with another blowing agent, such as water.

Flexible polyurethane foam, preferably slabstock foam, is prepared according to this invention by contacting the various components under conditions such that the components react to form a cellular polymer. Generally, the reaction mixture may contain additional components such as catalyst, cross-linkers, surfactants, colorants, cell openers, flame retardants, antioxidants, mold release agents and the like, which may vary according to the desired attributes of the foam, and whether the foam is a molded or slabstock foam. The use of such additional components is well understood in the art.

A catalyst for the reaction of the isocyanate-reactive compound and the polyisocyanate is also advantageously used in making foam according to this invention. Although a wide variety of materials are known to be useful for this purpose, the most widely used and preferred catalysts are the tertiary amine catalysts and the organometallic catalysts.

Exemplary tertiary amine catalysts, include, for example, triethylenediamine, N-methyl morpholine, N-ethyl morpholine, diethyl ethanolamine, N-coco morpholine, 1-methyl-4-dimethylaminoethyl piperazine, 3-methoxy-N-dimethylpropylamine, N,N-diethyl-3-diethylaminopropylamine, dimethylbenzyl amine, bis(2-dimethylaminoethyl)ether, and the like. Tertiary amine catalysts are advantageously employed in an amount from about 0.01 to about 5, preferably about 0.05 to about 2 parts per 100 parts by weight of the isocyanate-reactive compound.

Exemplary organometallic catalysts include organic salts of metals such as tin, bismuth, iron, mercury, zinc, lead and the like, with the organotin compounds being preferred. Suitable organotin catalysts include dimethyltindilaurate, dibutyltindilaurate, stannous octoate and the like. Other suitable catalysts are taught, for example, in U.S. Pat. No. 2,846,408. Advantageously, about 0.0001 to about 0.5 part by weight of an organometallic catalyst is used per 100 parts of the isocyanate-reactive compound.

Cross-linkers may be used, particlarly in high resiliency slabstock foam, in order to improve load-bearing and processing. Suitable such cross-linkers include alkanolamines and other compounds of about 200 or lower equivalent weight having about 3-8, preferably about 3-4, active hydrogen-containing groups per molecule. Exemplary such compounds are glycerine and trimethylylolpropane, as well as other alkylene triols. Preferred, however, are alkanolamines such as diethanolamine, triisopropanolamine, triethanolamine, diisopropanolamine, adducts of 4-8 moles of ethylene oxide and/or propylene oxide with ethylene diamine and the like, and ammonia and the like. Most preferred, on the basis of its optimum reactivity, is diethanolamine. When used, about 0.1 to about 4 parts of the cross-linker are advantageously employed per 100 parts of isocyanate-reactive compound.

Chain extenders may also be used to further improve the load-bearing of the foam. "Chain extenders," for the purposes of this invention, include compounds having two active hydrogen-containing groups per molecule and an equivalent weight from about 31 to about 300, preferably about 31 to about 150. Hydroxyl-containing chain extenders include the alkylene glycols and glycol ethers such as ethylene glycol, 1,3-propylene glycol, 1,4-butylene glycol, 1,6-hexamethylene glycol, diethylene glycol, triethylene glycol, dipropylene glycol, tripropylene glycol, 1,4-cyclohexanedimethanol and the like. Amine chain extenders include diethyltoluene diamine, phenylene diamine, methylene bis(o-chloroaniline), NaCl-blocked methylene bis(aniline), toluene diamine, aromatic diamines which are substituted for at least one of the carbon atoms adjacent to the amine groups with a lower alkyl group, and the like. Such chain extenders, when used, are advantageously employed in a minor amount, i.e., from about 2 to about 30 parts per 100 parts isocyanate-reactive compound.

In order to make a stable foam, i.e., one which does not collapse or contain significant quantities of large pores, it is preferred to employ a surfactant which stabilizes the foaming reaction mixture against collapse until the mixture is sufficiently cured to maintain its cellular configuration. Suitable surfactants include siloxane/poly(alkylene oxide) copolymers as described, for example, in U.S. Pat. Nos. 3,887,500 and 3,957,842. The selection and use of such surfactants in preparing foams is well-known.

In the commercial production of slabstock foam, the components can be and typically are introduced individually to a mixing head where they are thoroughly blended and metered onto a bed where foaming takes place. However, preblending of the components, except for the polyisocyanate, can be done if desired. The components are advantageously at room temperature or a slightly elevated temperature when blended in the mixing head, although preheating may be necessary in some instances to melt components which are solid at room temperature.

The foam of this invention is useful, for example, as bedding, furniture cushioning, padding, carpet underlayment, attached cushion carpet backing, automobile head rests, crash pads, door handles, head liners, seating and the like. This invention is particularly useful in applications wherein high load-bearing properties are required or where a low density, high water formulation is desired.

The following examples are given to illustrate the invention and should not be interpreted as limiting it in any way. Unless stated otherwise, all parts and percentages are given by weight.

EXAMPLE 1

In this example, a laboratory scale foam sample according to the invention (Sample No. 1) and a comparative sample (A) are prepared and subjected to a microwave/humid oven treatment to simulate conditions encounterd in making a full-scale slabstock polyurethane foam. The foam recipes are set out in Table 1. All amounts are in parts by weight except antioxidants, which are reported in ppm based on the weight of polyether, and TDI (toluene diisocyanate), which is reported as isocyanate index.

Polyol A is a 3100 molecular weight, nominally trifunctional random copolymer of propylene oxide and ethylene oxide. Polyol B is a dispersion of 70% styrene/30% acrylonitrile copolymer particles in Polyol A. It contains 43% solids.

"ATP" in this and subsequent examples is an α-tocopherol mixture sold by Roche Vitamins and Fine Chemicals under the name Ronotec TM 201. It contains mainly α-tocopherol, with a small quantity of other tocopherols. The antioxidant referred to as Irganox TM L-135 is a commercially available grade of the 3,5-di-t-butyl-4-hydroxyhydrocinnimic acid ester of a mixture of C7-C9 alcohols. The antioxidant referred to as Irganox TM 5057 is a commercial liquid diphenyl amine antioxidant which is the reaction product of N-phenyl benzenamine and 2,4,4-trimethylpentane. "PDDP" is phenyl diisodecyl phosphite, manufactured by General Electric as Weston TM PDDP. Naugard TM 445" is 4,4'-bis α,α-dimethylbenzyl diarylamine, a solid hindered diarylamine antioxidant manufactured by Uniroyal Chemicals.

TABLE 1

| Component | Sample No. 1 | Sample No. A* |
|---|---|---|
| Polyol B | 65 | 65 |
| Polyol A | 35 | 35 |
| BHT | 0 | 3000 |
| Naugard TM 445 | 0 | 1500 |
| ATP | 100 | 0 |
| Irganox TM L-135 | 400 | 0 |
| Irganox TM 5057 | 100 | 0 |
| PDDP | 200 | 0 |
| Total antioxidant | 800 | 4500 |
| Water | 3.8 | 3.8 |
| Tertiary amine catalyst | 0.25 | 0.25 |
| Organotin catalyst | 0.44 | 0.44 |
| Silicone surfactant | 1.0 | 1.0 |
| TDI (Index) | 100 | 100 |

*Not an example of this invention.

The antioxidants are blended into the polyols prior to making the foam samples. In making the foams, all components except the TDI are mixed together for 20 seconds at 3000 rpm in a quart semi conical milkshake container. This is followed by the toluene diisocyanate (TDI) and stirred for 4 seconds. The foaming mixture is poured into a 12 inch × 12 inch × 4 inch box and allowed to reach full rise height before beginning the microwave/humid oven process. The volume of the foam is sufficient to cause the foam to rise to a crown approximately 3 inches above the open top of the high box. A four inch square of the top skin or crust is removed from each foam within 3 minutes of mixing in order to provide a free path of air into the foam center during the microwave/humid oven treatment described below. For a similar reason, the foam recipe is one which provides an open celled foam so that in the microwave/humid oven treatment, humid air can easily reach the center of the of the foam sample.

Five minutes after the TDI is blended with the other components, the foam sample is placed in a microwave oven and heated for 3.5 minutes at 40% power. At this time and power setting, this microwave would put about 13,200 calories into 400 g of water in a polyethylene beaker. The principle purpose of the microwave is to provide additional heat to the foam as it cures to approximate the extreme heat found in the center of a large foam bun after it has been freshly poured.

Immediately following the microwave treatment, each microwaved sample is removed from the oven and placed in a Blue M TM constant temperature and humidity oven set at 80 degrees C. and 60 percent relative humidity to provide a moisture saturated environment in which the hot foam to cools for 30 minutes. The moist air that infuses into the foam tends to increase the discoloration of the samples and to a large extent nullify the variability of ambient conditions found in the laboratory during the foam preparation.

The samples, as prepared above, are then color evaluated using the LAB measuring system and a Hunter Lab Colorimeter. This test is a modification of the standard test method ASTM E-306. The sample's color is compared to a standarized white tile and reported as ΔE, according to the Tristimulus Color Scale. In the Tristimulus Color Scale, a ΔE of about 80 represents a char colored foam and a ΔE of about 0 represents the standardized white tile. An optimum white colored foam would have a ΔE of about 5.

Under this test, no evidence of discoloration or foam degradation is seen for either sample. Thus, under these conditions, the antioxidant package of this invention is as effective as the conventional antioxidant package, even though the total amount of antioxidant has been reduced by 82% by weight.

In order to more severely test the antioxidants, Sample No. 1 and Comparative Sample A are repeated and again tested, with two changes. These foams are designated Sample No. 2 and Comparative Sample B, respectively. The foam formulations have 4.5 parts water (with a corresponding increase in TDI), and the microwave exposure time is increased to 4 minutes, 15 seconds. The increase in water in the foam formulations increases the reaction exotherm, and the increase in microwave exposure further increases the temperatures to which the samples are exposed. Under these conditions, both Sample No. 2 and Comparative Sample B show discoloration. Sample No. 2 shows a ΔE value of 13.96, whereas Comparative Sample B shows a ΔE value of 23.45. These Δvalues indicate a very significant difference in the discoloration of the respective foams, and that the antioxidant package of this invention provides superior protection against thermal degradation and discoloration than the conventional antioxidant package.

EXAMPLE 2

In this example, a series of pilot scale slabstock polyurethane foams are prepared (Sample No. 3 and 4 and Comparative Sample C). The formulations contain high water levels and a flame retardant additive, both of which are known to cause discoloration and degradation of the foam. In making the foam, all components (except the antioxidants which are blended with the polyol beforhand) are simultaneously mixed and dispensed using a Varimax TM trough type slabstock foam machine with a nominal capavity of 150 lb of polyol/minute. In this manner, buns with cross-sectional dimensions of 54" wide × 36-40" high are made. Thermocouples are placed in the foam buns to monitor internal temperatures. All foams are made sequentially without stopping operation of the machine, to minimize any influence ambient conditions might have on test results.

The resulting foams are cooled overnight at ambient conditions and then evaluated for color and physical properties. The foam formulations are as reported in Table 2, and the color and physical property results are as reported in Table 3.

TABLE 2

| | Amount-parts by weight (Antioxidants reported in ppm based on polyol) | | |
|---|---|---|---|
| Component | C* | 3 | 4 |
| Polyol A | 100 | 100 | 100 |
| Water | 6 | 6 | 6 |
| Flame retardant | 15 | 15 | 15 |
| Silicone surfactant | 1.0 | 1.0 | 1.0 |
| Tertiary amine catalyst | 0.25 | 0.25 | 0.25 |
| Organotin catalyst | 0.15 | 0.15 | 0.15 |
| TDI (index) | 100 | 100 | 100 |
| ATP | 0 | 100 | 100 |
| BHT | 4000 | 0 | 500 |
| Naugard TM -445 antioxidant | 1000 | 0 | 0 |
| Irganox TM L-135 | 0 | 320 | 0 |
| Irganox TM L-5057 | 0 | 180 | 0 |
| PDDP TM | 0 | 200 | 200 |
| Total Antioxidant | 5000 | 800 | 800 |

*Not an example of this invention.

TABLE 3

| | Sample or Comparative Sample No. | | |
|---|---|---|---|
| Property | C* | 3 | 4 |
| 25% IFD, lb① | 29.2 | 29.9 | 29.7 |
| Tensile Strength, psi① | 15.3 | 16.5 | 15.7 |
| Tear Strength, pli① | 3.1 | 3.1 | 3.2 |
| Elongation, %① | 269 | 340 | 280 |
| Peak Foam Temperature | 335° F. | 340° F. | 342° F. |
| ΔE② | 50.3 | 45.5 | 45.2 |

*Not an example of this invention.
①ASTM D-3574-81.
②Color value from Tristimulus Color Scale.

As can be seen from the results in Table 3, the antioxidant of this invention provides foam with properties equivalent to those of the Comparative Sample in every respect, except that it provides a superior color. In the range of ΔEvalues, of 45–50, a five-unit difference in ΔE value is easily visible, and reflects an improvement in color stabilization provided by the antioxidant. This is despite a 84% reduction in total antioxidant concentration.

EXAMPLE 3

Comparative Sample C is twice repeated, with the following modifications to the formulations. The flame retardant level is reduced to 12 parts, and the water is increased to 7.5 parts (with a corresponding increase in TDI). The additional water is included to increase the exothermic temperature rise in the buns, in order to more stringently test the antioxidant packages. The antioxidant package is modified in each case. In one case (Sample No. 5) an antioxidant package according the invention is used. In Comparative Sample D, a conventional antioxidant package is used. The antioxidant packages and test results are as indicated in Table 4.

TABLE 4

| | Sample or Comparative Sample No. | |
|---|---|---|
| Property | D* | 5 |
| ATP | 0 | 100 |
| Irganox TM L-135 | 0 | 400 |
| Irganox TM 5057 | 0 | 100 |
| PDDP | 0 | 200 |
| BHT | 4000 | 0 |
| Naugard TM 445 | 1000 | 0 |
| Total Antioxidant | 5000 | 800 |
| Density, pcf① | 1.01 | 0.98 |
| 25% IFD, lb① | 26.8 | 23.9 |
| Tensile Strength, psi① | 13.4 | 12.5 |
| Tear Strength, pli① | 3.13 | 1.93 |
| Elongation, %① | 223 | 159 |
| Peak Foam Temperature | 370° F. | 373° F. |
| ΔE② | 58.4 | 62.0 |

*Not an example of this invention.
①ASTM D-3574-81.
②Color value from Tristimulus Color Scale.

The data in Table 4 indicates that both antioxidant packages are comparable under these conditions, with the physical properties being essentially the same for both foams, except for a slight decrease in tear strength in Sample 5. Both samples are highly colored, with the conventional antioxidant package giving slightly better results under these extreme conditions. However, Sample 3 provides substantially the same effect despite an 84% reduction in total antioxidant.

EXAMPLE 4

Foam samples 6–9 and Comparative Sample E are prepared from the same formulations as Sample 3 (Table 4), except 4.5 parts water are used (with a corresponding decrease in TDI), the TDI index is increased to 120, no flame retardant is used, and the antioxidant package is changed. The antioxidant packages and the results of a color evaluation following the microwave/humid oven treatment are reported in Table 5. Naugard TM 431 is a liquid hindered phenolic antioxidant, as is Naugard TM 529. Naugard TM 0 76 is a commercial grade octadecyl-3,5-di-t-butyl-4-hydroxy hydrocinnimate. All Naugard TM products mentioned are manufactured by Uniroyal Chemicals.

TABLE 5

| | Sample or Comparative Sample No. | | | | |
|---|---|---|---|---|---|
| Property | E* | 6 | 7 | 8 | 9 |
| ATP | 0 | 100 | 100 | 100 | 100 |
| NAUGARD TM 431 | 0 | 500 | 0 | 0 | 0 |
| NAUGARD TM 76 | 0 | 0 | 500 | 0 | 0 |
| Irganox TM L-135 | 0 | 0 | 0 | 500 | 0 |
| NAUGARD TM 529 | 0 | 0 | 0 | 0 | 500 |
| BHT | 3593 | 0 | 0 | 0 | 0 |
| NAUGARD TM 445 | 1803 | 0 | 0 | 0 | 0 |
| PDDP | 0 | 200 | 200 | 200 | 200 |
| Total Antioxidant | 5396 | 800 | 800 | 800 | 800 |
| ΔE① | 34.8 | 46.1 | 44.3 | 43.6 | 45.9 |

*Not an example of this invention.
①Color value from Tristimulus Scale.

The data in Table 5 indicates that at the concentrations of the antioxidant packages used, the conventional package provides the best color. However, the physical properties of Comparative Sample E were severely degraded, such that the center of the foam had no integrity. The center of the foam disintegrated upon touch and could easily be pierced by the finger, with granular crumbs forming.

EXAMPLE 5

Foam samples 10 and 11 Comparative foams F and G are prepared from the same formulation as Comparative Foam C, except only 4.5 parts are used (with a corresponding decrease in TDI), the TDI index is 120, the FR agent is omitted, and the antioxidant is changed. The foams are the subjected to the microwave/humid oven treatment described before with an exposure time of 4 minutes, 15 seconds. The antioxidants used and color measurements are as reported in Table 6.

TABLE 6

| Property | Sample or Comparative Sample No. | | | |
|---|---|---|---|---|
| | F* | G* | 10 | 11 |
| ATP | 0 | 0 | 100 | 100 |
| BHT | 3831 | 0 | 0 | 0 |
| NAUGARD ™ 445 | 1555 | 0 | 0 | 0 |
| Irganox ™ L-135 | 0 | 400 | 0 | 400 |
| Irganox ™ 5057 | 0 | 100 | 0 | 100 |
| PDDP | 0 | 200 | 0 | 200 |
| Total Antioxidant | 5386 | 700 | 100 | 800 |
| ΔE | 23.45 | 60.19 | 33.27 | 13.96 |

*Not an example of this invention.
①Color value from Tristimulus Scale.

The data in Table 6 shows that 100 parts ATP as the sole antioxidant is less effective at reducing color than the conventional combination used in Comparative Sample F. However, that comparative sample contains 54 times the amount of antioxidant. Sample 11 shows how the inclusion of the additional antioxidant reduces color so that this sample is far superior to Comparative Sample F, even though these additional antioxidants, when used without ATP, provide very poor color stabilization at the levels used (as in Comparative Sample G).

EXAMPLE 6

Foam samples 12, 13 and 14 and Comparative Samples H and I are prepared from the same formulation as Comparative Foam C, except only 4.5 part water are used (with a corresponding decrease in TDI), the TDI index is 120 and the antioxidant is changed. The foams are then subjected to the microwave/humid oven treatment described before with an exposure time of 4 minutes, 15 seconds. The antioxidants used and color measurements are as reported in Table 7.

TABLE 7

| Property | Sample or Comparative Sample No. | | | | |
|---|---|---|---|---|---|
| | H* | I* | 12 | 13 | 14 |
| ATP | 0 | 0 | 100 | 500 | 100 |
| BHT | 3579 | 666 | 0 | 0 | 0 |
| NAUGARD ™ 445 | 1724 | 333 | 0 | 0 | 0 |
| Irganox ™ L-135 | 0 | 0 | 400 | 400 | 400 |
| Irganox ™ 5057 | 0 | 0 | 100 | 100 | 100 |
| PDDP | 0 | | 0 | 200 | 200 |
| Total Antioxidant | 5303 | 999 | 600 | 1200 | 800 |
| ΔE | 48.76 | 57.37 | 51.31 | 49.49 | 52.67 |

*Not an example of this invention.
①Color value from Tristimulus Scale.

Comparative Example H and Sample 13 have essentially no difference in color, even though Sample 13 contains 77% less antioxidant. Samples 12 and 14 have slightly more color, but contain even less antioxidant. Comparative Sample I shows a very substantial increase in color when the conventional antioxidant package is used in amount comparable to Samples 12–14, and is substantially worse than any of the others.

What is claimed is:

1. In a method for preparing a polyurethane, polyurethane-urea or polyurea polymer wherein an isocyanate-reactive polyether is reacted with a polyisocyanate under conditions sufficient to form said polyurethane, polyurethane-urea or polyurea polymer, the improvement wherein said isocyanate-reactive polyether contains a 6-chromanol derivative in an amount effective to inhibit the oxidation of said polyether.

2. The improved method of claim 1, wherein said 6-chromanol derivative is tocol, α-tocopherol or δ-tocopherol.

3. The improved method of claim 2, wherein said isocyanate-reactive polyether further contains an effective amount of an additional antioxidant.

4. The improved method of claim 3, wherein said polyurethane, polyurethane-urea or polyurea polymer is a slabstock flexible foam, and said reaction of the polyisocyanate with the isocyanate-reactive polyether is conducted in the presence of water.

5. The improved method of claim 4, wherein said additional antioxidant comprises a liquid hindered phenol, a liquid diaryl amine, or mixture thereof.

6. The improved method of claim 5 wherein said additional antioxidant further comprises an organophosphite.

7. The improved method of claim 5 wherein said isocyanate-reactive polyether contains about 50 to about 200 parts per million α-tocopherol, based on weight of isocyanate-reactive polyether, about 0.5–5 parts by weight of a liquid hindered phenol per part by weight α-tocopherol, and about 0.5–3 parts by weight of a liquid diaryl amine per part by weight α-tocopherol.

8. The improved method of claim 7 wherein said isocyanate-reactive polyether further comprises about 0.5 to about 3 parts by weight or an organophoshite, per part by weight α-tocopherol.

9. A polyether polyurethane, polyether polyurethane-urea or polyether polyurea containing a 6-chromanol derivative in an amount effective to inhibit the oxidation of said polyether polyurethane, polyether polyurethane-urea or polyether polyurea.

10. The polyether polyurethane, polyether polyurethane-urea or polyether polyurea of claim 9 wherein said 6-chromanol derivative is tocol, α-tocopherol, or δ-tocopherol.

* * * * *